Figure 1:
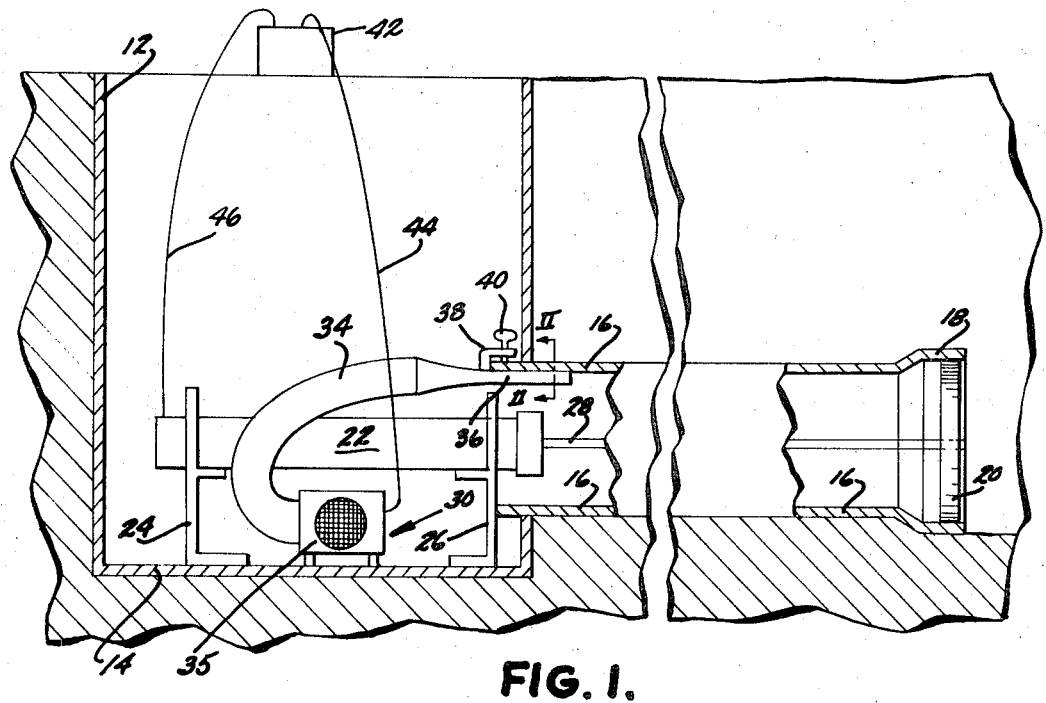

United States Patent [19]

Roodvoets et al.

[11] 3,827,156

[45] Aug. 6, 1974

[54] METHOD AND APPARATUS FOR LAYING A PIPELINE

[75] Inventors: Roger J. Roodvoets; Merlin J. Applegate, both of Grand Rapids, Mich.

[73] Assignees: Laser Alignment, Inc., by said Roodvoets; Alignment Systems, Inc., both of Grand Rapids, Mich. ; by said Applegate

[22] Filed: Sept. 30, 1968

[21] Appl. No.: 763,786

[52] U.S. Cl. .................................. 33/228, 33/286
[51] Int. Cl. .......................................... G01b 11/27
[58] Field of Search ............ 33/46.2, 1 H; 350/179, 350/63; 356/130; 250/218; 98/DIG. 7

[56] References Cited
UNITED STATES PATENTS

| | | | |
|---|---|---|---|
| 1,072,828 | 9/1913 | Cummings | 350/63 |
| 2,187,908 | 1/1940 | McCreary | 250/217 |
| 2,557,866 | 12/1951 | Webb | 33/46.2 |
| 2,796,822 | 6/1957 | Nikolajevic | 98/DIG. 7 |
| 2,959,090 | 11/1960 | Davies | 350/63 |
| 3,337,717 | 8/1967 | Cerf | 350/63 |
| 3,413,059 | 11/1968 | Berreman | 350/179 |
| 3,415,588 | 12/1968 | Berreman | 350/179 |

FOREIGN PATENTS OR APPLICATIONS

| | | |
|---|---|---|
| 8,727 | 3/1915 | Great Britain |
| 114,752 | 4/1918 | Great Britain |

*Primary Examiner*—Louis R. Prince
*Assistant Examiner*—Charles E. Phillips
*Attorney, Agent, or Firm*—Price, Heneveld, Huizenga & Cooper

[57] ABSTRACT

This disclosure relates to a method and apparatus for laying a pipeline in which the pipes are aligned along a preselected path with a collimated light beam, preferably according to the method of U.S. Pat. No. 3,116,557. Air is blown through the pipeline to prevent gases from building up within the pipeline as the pipes are being laid. A blower unit with a flexible conduit is provided for this purpose.

11 Claims, 2 Drawing Figures

PATENTED AUG 6 1974　　　　　　　　　　3,827,156

INVENTOR.
ROGER J. ROODVOETS
BY
ATTORNEYS

METHOD AND APPARATUS FOR LAYING A PIPELINE

This invention relates to laying of a pipeline. In one of its aspects, it relates to a method of laying pipes in which a collimated light beam such as a laser beam is projected co-axially through the pipes, wherein air is moved through the pipeline to prevent the build up of refracting gases within the pipeline.

In another of its aspects, the invention relates to a system for laying a pipeline, the system having a collimated light source for projecting a collimated light beam co-axially of a pipeline, a target means coupled on the end of the last pipe to align the end of the pipe with the collimated light beam, and blower means are provided for moving air through the pipeline to prevent deleterious build up of gases within the pipe.

In U.S. Pat. No. 3,116,557 there is disclosed and claimed a method for laying a pipeline with the use of a collimated light beam which is aligned along a pre-selected path for the pipeline. The last pipe in the line has a target coupled to the end. The pipe is moved until the target is aligned with the collimated beam and the pipe is then fixed in place. The pipeline is extended by inserting one end of another pipe into the end of the aligned pipe and aligning the other end with a target in the same manner as the previous pipe. The process is repeated until the pipeline has been extended the desired length.

Although this method works well with a laser beam as a collimated light beam, it has been found that the laser beam bends slightly after a certain length of the smaller pipe has been laid, thereby causing misalignment of the pipes. Normally, this condition appears after about two hundred feet of pipe has been laid. Although it is not known exactly why this occurs, it is believed that the gases resulting from the pipe joint sealing compositions and othes sources build up within the pipes and distort or refract the light beam.

I have now discovered that this distortion or diffraction of the laser beam and other such collimated light beams can be eliminated by moving the air through the pipe during the pipe laying operation.

By various aspects of this invention, one or more of the following, or other, objects can be obtained.

It is an object of this invention to provide an improved method and apparatus for laying pipes along a pre-selected path.

It is a further object of this invention to prevent distortion or refraction of a collimated light beam which is projected through a pipeline being laid with the aid of the light beam.

Other aspects, objects, and the several advantages of this invention are apparent to one skilled in the art from a study of this disclosure, the drawings, and the appended claims.

According to the invention, there is provided a system for laying pipes along a pre-selected path with the use of a collimated light source which projects a collimated light beam co-axially of the pipes, i.e., parallel to the flow line of the pipe. Blower means are provided for moving air through the pipeline so as to prevent the build up of gases within the pipeline.

Further, according to the invention, there is provided a method for laying a pipeline along a pre-selected path wherein a collimated light beam is projected along the path and each pipe segment in the pipeline is laid successively by aligning an end of the pipe segment with the collimated light beam. Air is moved through the pipeline during the laying of the various segments so as to prevent the build up of deleterious gases within the pipeline.

Figure 2:
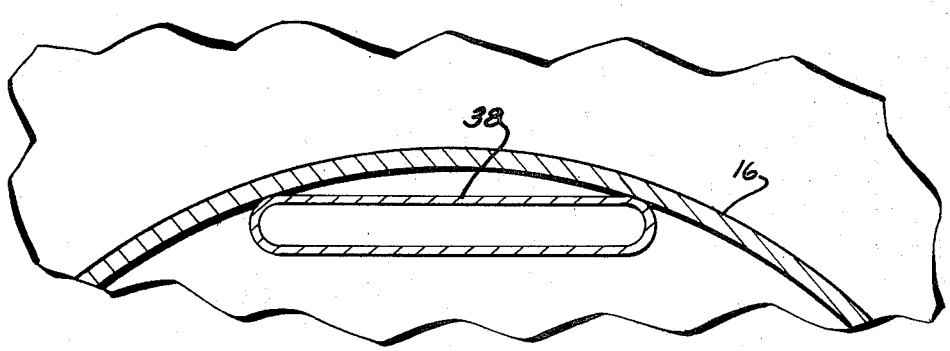

The invention will now be described with reference to the accompanying drawings in which:

FIG. 1 is a cross-sectional view of a schematic representation of the invention; and FIG. 2 is a cross-sectional view seen along lines II-II of FIG. 1.

Referring now to the drawings, a pre-cast manhole 12, having a bottom 14 and a pipeline 16, has positioned therein a laser beam generator 22. Generator supports 24 and 26 support the laser beam generator 22 within the bottom of the pre-cast manhole. The generator directs a laser beam 28 co-axially along the pipeline 16. The end pipe in the pipeline has a target 20 with a translucent screen for viewing the position of the laser beam on the target. The target is positioned within an enlarged end 18 of the end pipe. The laser beam generator 22 is pre-aligned so that the laser beam 28 follows a predetermined path and the pipeline is laid within an excavated ditch according to the method disclosed and claimed in U.S. Pat. No. 3,116,557, which is incorporated herein by reference.

It has been found that when laying pipe according to this method, the laser beam appears to bend after about two hundred feet of pipe has been laid. It is believed that this bending of the laser beam is due to stagnant gases which accumulate within the pipeline. These gases are believed to refract the laser beam, thereby causing misalignment of the pipes within the pipeline.

According to the invention, the air within the pipeline is caused to flow therethrough in order to prevent the accumulation of gases within the pipeline. For this purpose, a blower unit 30 having a fan 32 causes air to flow through the pipeline by means of a flexible tube 34 and an adapter 36 with a flat mouth. The fan has an intake 35 and an outlet which is connected to the flexible tube 34. The adapter 36 is fixed to the pipeline through a clamp L 38 having a thumb screw 40. The flat mouth, illustrated in FIG. 2, causes the air to flow along an inner circumferential edge of the pipe.

A battery 42 supplies electric current to the fan 32 through an electrical cord 34. The battery 42 can also be used to supply power to the laser beam generator 22 through an electrical cord 46.

In operation, the pipes are laid according to the method disclosed and claimed in U.S. Pat. No. 3,116,557. During the pipe laying operation, the fan 32 is operated to force air through the pipeline so as to exhaust any gases which might build up within the pipeline. To this end, it is desirable that target 20 have openings adjacent the pipe to permit the air to freely flow out of the expanded end 18 of pipe 16. The air can be blown continuously or intermittently. Preferably, the air is continuously blown through the pipeline.

Whereas the invention has been described with reference to blowing air through the pipe, it is also within the scope of the invention to provide an exhaust fan or other type of suction means at one end of the pipeline 16 and withdraw air from the pipeline. Other modifications will be suggested to those skilled in the art.

Reasonable variation and modification are possible within the scope of the foregoing disclosure and the drawings without departing from the spirit of the invention.

The embodiment of the invention in which an exclusive property or privilege is claimed are defined as follows:

1. In a system for laying a pipeline along a pre-selected path with the use of a collimated light source which projects a collimated light beam co-axially of the pipe, and wherein gases which build up in said pipeline deleteriously affect the linearity of the collimated light beam, the improvement which comprises: blower means for moving air through said pipeline so as to prevent the build up of gases within said pipeline.

2. A system for laying a pipeline according to claim 1 wherein said collimated light source is a laser beam generator and said collimated light beam is a laser beam.

3. A system for laying pipeline according to claim 2 wherein said blower means comprises a casing having an air inlet means and an air outlet means, a fan within said casing to draw sufficient air in through said inlet means and to force sufficient air out through said outlet means to prevent deleterious gases from accumulating in said pipeline, said blower means further including, a flexible tube connected to said outlet means and clamping means on the end of said flexible tube to fix said flexible tube to the end of a pipe section affixed to said pipeline.

4. A system for laying a pipeline according to claim 3 wherein said clamping means has a flattened mouth communicating with said flexible tube to force air through said pipeline at an inner circumferential edge thereof.

5. In a method for laying a pipeline along a pre-selected path wherein a collimated light beam is projected along said pre-selected path, and each pipe segment in said pipeline is laid successively by aligning an end of said pipe segment with said collimated light beam, and wherein said light beam is refracted by gases which build up within said pipe as said pipeline is constructed, the improvement which comprises: moving air through said pipeline during the construction of said pipeline so as to prevent the deleterious build up of gases within said pipeline.

6. A method for laying pipeline according to claim 5 wherein air is continuously circulated through said pipeline.

7. A method for laying a pipeline according to claim 6 wherein air is blown through said pipeline from a point adjacent that at which said collimated beam is projected through said pipeline.

8. A method for laying a pipeline according to claim 5 wherein air is blown through said pipeline from a point adjacent that at which said collimated beam is projected through said pipeline.

9. A method for laying a pipeline according to claim 8 wherein said air is forced through said pipeline adjacent the circumferential edge thereof.

10. A method for laying a pipeline according to claim 5 wherein said collimated light beam is a laser beam.

11. In combination with apparatus for aligning a plurality of pipe sections along a predetermined invert to form a string of pipe sections such apparatus comprising:

a light source for providing a narrow collimated beam of light adapted to be projected along a straight axis;

means for supporting said light source for projecting said beam of light through a section of pipe parallel to said invert;

a target means adapted to be associated in a predetermined position with respect to the exit end of said section of pipe, said target means being movable together with the exit end of the pipe section with which it is associated and said target means being transferable from one end of one pipe section to another so as to be associable in said predetermined position with respect to each section of pipe;

the improvement comprising:

blower means adapted to be associated with a string of said pipe sections for moving air through said string of pipe sections; said blower means having the capacity to move sufficient air through said pipe so as to prevent the build up of deleterious gases which would adversely affect the position of said light beam within a string of pipe.

* * * * *

UNITED STATES PATENT OFFICE
CERTIFICATE OF CORRECTION

Patent No. 3,827,156              Dated August 6, 1974

Inventor(s) Roger J. Roodvoets; Merlin J. Applegate

It is certified that error appears in the above-identified patent and that said Letters Patent are hereby corrected as shown below:

Assignee: Should be --- Laser Alignment, Inc.,

Signed and sealed this 10th day of December 1974.

(SEAL)
Attest:

McCOY M. GIBSON JR.
Attesting Officer

C. MARSHALL DANN
Commissioner of Patents